Figure 1:
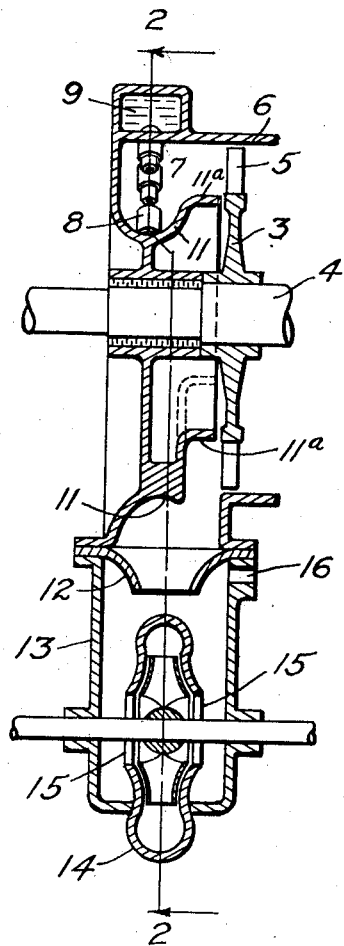

R. N. EHRHART.
CONDENSER.
APPLICATION FILED SEPT. 29, 1917.

1,352,438.

Patented Sept. 14, 1920.

INVENTOR.
Raymond N. Ehrhart.
BY Green & McCallister
his ATTORNEYS.

UNITED STATES PATENT OFFICE.

RAYMOND N. EHRHART, OF EDGEWOOD PARK, PENNSYLVANIA, ASSIGNOR TO WESTINGHOUSE ELECTRIC & MANUFACTURING CO., A CORPORATION OF PENNSYLVANIA.

CONDENSER.

1,352,438. Specification of Letters Patent. Patented Sept. 14, 1920.

Application filed September 29, 1917. Serial No. 194,005.

*To all whom it may concern:*

Be it known that I, RAYMOND N. EHRHART, a citizen of the United States, and a resident of Edgewood Park, in the county of Allegheny and State of Pennsylvania, have made a new and useful Invention in Condensers, of which the following is a specification.

This invention relates to condensers and has for an object to produce a new and improved condenser of the jet type, which is more compact than other condensers of the same type now in use and known to me.

A further object is to produce a condenser which may advantageously be located directly in the exhaust passage of the turbine which it serves.

A further object is to produce a condenser which is specially adapted for use on locomotives or in any place where compactness and high efficiency are important considerations.

These and other objects are attained by means of a condenser embodying the features herein described and illustrated in the drawings accompanying and forming a part hereof.

Under some conditions it is desirable to have a condenser as compact as possible, for example, on board a locomotive or a ship. Compactness is a desirable feature in nearly all installations since it tends toward highest efficiency by reducing opportunity for leakage and radiation losses. A jet condenser is ordinarily placed beneath the turbine or other apparatus served by it, and consequently the installation requires considerable head room. Installations embodying my invention are unusually compact and efficient. In the illustrated embodiment the desired compactness is attained by placing a large part of the condenser directly in the exhaust passage of the turbine, and my invention also contemplates a construction which prevents the cooling water of the condenser from entering or being splashed into the blades of the turbine.

In the drawings: Figure 1 is a fragmental sectional view of a condenser embodying my invention, the section being taken along the line 1—1 of Fig. 2.

Figure 2:
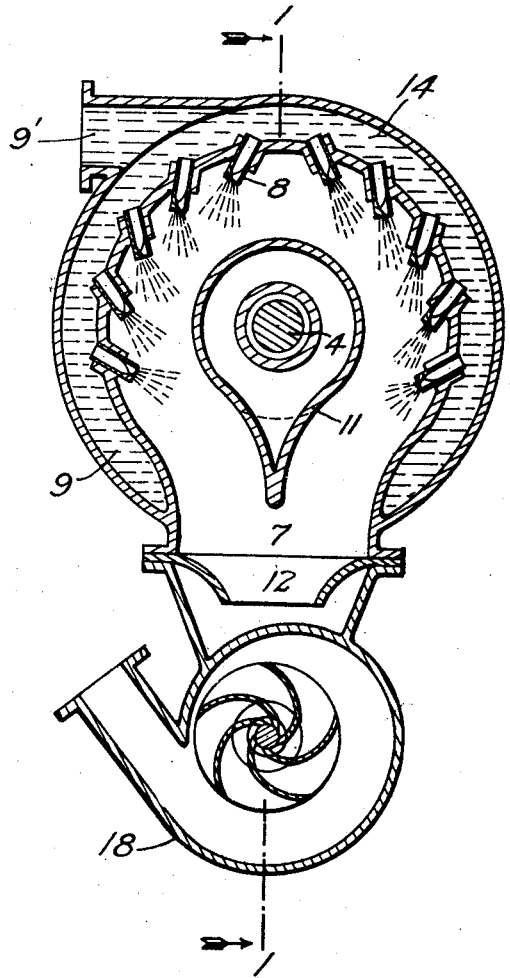

Fig. 2 is a sectional view along the line 2—2 of Fig. 1.

The turbine illustrated in Fig. 1 includes a rotor element 3 mounted on a shaft 4 and equipped with blades 5. The inclosing casing 6 of the turbine rotor terminates in an exhaust chamber 7, which is equipped with cooling water delivery nozzles 8 and water discharge passages so arranged that the exhaust chamber in effect constitutes a condenser for the steam issuing from the turbine. As illustrated, a water box 9 surrounds the chamber 7, receives cooling water through a port 9', and delivers water to the nozzles 8. The nozzles are so arranged that they deliver a mass of separate drops or spray as close to the last row of blades 5 as is permissible without discharging water into the blades. In order to accomplish this, the water discharged from the nozzles is received by a trough 11 and the arrangement of the nozzles is such that each discharges substantially tangentially with relation to the longitudinal axis of the trough. As illustrated, the trough is formed in a reentrant angle 11ª of the turbine casing, which as shown extends into close proximity with the turbine rotor, but is so formed that the water entering the trough is prevented from splashing or flowing into the working passages of the turbine.

The nozzles 8 are divided into two groups, each of which is located on one side of the vertical plane passing through the axis of the turbine. The nozzles of each group are inclined downwardly and are so spaced that the water delivered from them forms a substantially continuous curtain into and through which the steam issuing from the blades 5 must pass. The water discharged from the upper nozzles of both groups is received by the upper portion of the trough, the longitudinal axis of which is substantially semicircular. The lower portion of the trough extends downwardly into the lower portion of the chamber 7, the line of its longitudinal curvature being such that the flange 11ª is gradually tapered to a point and in effect forms a guide which extends downwardly to a point near the bottom of the chamber 7. With this arrangement the flange forms an apron which prevents the water issuing from the nozzles 8 from entering the blades 5. The water discharged from the chamber 7 passes through a convergent cone 12 into a condensate well 13 which corresponds in function to the condensate well of an ordinary condenser. As illustrated, a centrifugal pump 14 is so located that its intake ports 15 are within the well 13. This pump may be employed for removing both air and water from the well, but in the drawings I have illustrated an air offtake port 16 located near the top of the well casing and in such a position that the cone 12 forms a protective apron for it.

An important advantage gained by my invention is that the condenser and the turbine are combined into a compact apparatus and the steam issuing from the turbine is condensed almost immediately adjacent to the last row of turbine blades. In addition to this the compact structure obviates the necessity of a multiplicity of joints and therefore reduces the possibility of air leaks.

While I have described and illustrated but one embodiment of my invention, it will be apparent to those skilled in the art that various changes, modifications, additions and admissions may be made in the apparatus described and illustrated without departing from the spirit and scope of the invention as set forth by the appended claims.

What I claim is:

1. In combination with the casing of a turbine having an exhaust passage and an exhaust port formed therein, means for delivering cooling liquid into the exhaust passage toward the central portion of the casing for condensing motive fluid discharged from the working passages of the turbine, and a trough receiving the said liquid disposed between the cooling liquid delivering means and the axis of the turbine for constantly preventing the cooling liquid from entering the working passages of the turbine and for directing the liquid through the exhaust port.

2. In combination with the casing of a turbine having an exhaust passage formed therein, an annular row of nozzles for discharging jets of cooling liquid into the exhaust passage, and an annular deflecting means disposed between the nozzles and the turbine axis against which said jets are projected for preventing liquid from being splashed into the working passage of the turbine, said jet discharging means being so arranged that the jets are projected substantially tangentially with relation to said deflecting means.

3. A turbine casing having an exhaust passage formed therein, two groups of nozzles projecting into said passage and inclined in opposite directions on opposite sides of the passage, and a trough within the exhaust passage for receiving jets of fluid discharged by the nozzles.

4. In combination, a jet condenser having a vertical annular condensing chamber, communicating directly with the working passages of a turbine, said chamber being provided with a discharge port, means for discharging inclined jets of cooling water into said chamber, means for delivering cooling water to said means, a trough forming an inner wall of the annular chamber and against which said jets are projected and forming a directing guide for fluids discharged through the discharge port, and a hot well communicating with said port.

5. In a jet condenser, a substantially annular inlet chamber having a discharge port at the bottom thereof, and an annular inlet port formed in one side of the chamber, means for discharging jets of cooling liquid across said chamber in a radial plane and in a substantially tangential direction with relation to the inner annular wall of the chamber.

6. In combination with a turbine casing having an exhaust passage and a port formed therein, a plurality of nozzles in the outer wall of said chamber for discharging jets of cooling water across the chamber, said nozzles being inclined in opposite directions on opposite sides of the chamber, so as to point substantially toward the exhaust port, and a reëntrant flange projecting into the exhaust passage forming a trough for receiving the jets of cooling water and for preventing water from being splashed onto the blades of the turbine.

7. In a jet condenser having a vertical annular inlet chamber provided with a lateral inlet port, a plurality of nozzles extending from the outer annular wall of said chamber for discharging jets of cooling water across said chamber and in a tangential direction relatively to the inner wall of the chamber, said nozzles being spaced from the wall so as to allow fluids to be condensed to pass around the jets and to thereby cause both sides of the jets to be effective in condensing said fluids.

8. In a jet condenser, a substantially annular condensing chamber having an outwardly open annular condensate trough, nozzles arranged around the outer wall of said condenser for discharging jets of cooling liquid into said chamber and toward the said trough and a combining cone for collecting and discharging liquid from said chamber.

9. The combination with a turbine having an annular exhaust passage receiving fluid from an annular row of turbine blading, of a means for discharging cooling fluid across the passage toward the inner annular wall of the passage, the said wall being formed to direct the fluid away from the said blading.

10. The combination with a turbine having an annular exhaust passage receiving fluid from an annular row of turbine blading and having an exhaust port, of a means for discharging cooling fluid across the passage toward the said exhaust port and against the inner annular wall of the passage, the said wall being formed to direct the fluid away from the said blading and toward the said port.

11. The combination with a turbine having an exhaust casing surrounding an annular row of turbine blading and exhausting through a port in the casing, of a cooling fluid jacket surrounding a portion of the said casing and having openings therein through which cooling fluid is discharged into the exhaust casing, the said casing surrounded by the jacket being formed to drain fluid condensing thereon toward the said port.

12. The combination with a turbine having an exhaust casing surrounding an annular row of turbine blading and exhausting through a port in the casing, of a cooling fluid jacket surrounding a portion of the said casing, the said casing surrounded by the jacket being formed to drain fluid condensing thereon toward the said port, and nozzles communicating with the said jacket adapted to discharge cooling fluid from the jacket into the exhaust casing.

13. The combination with a turbine having an annular row of blading, of a means for concentrating the fluid flowing therefrom in an annular passage having an exhaust port in one side thereof, and condensing means for forcing the fluid entering the passage to traverse the shortest path to the said exhaust port.

In testimony whereof, I have hereunto subscribed my name this 24th day of September, 1917.

RAYMOND N. EHRHART.

Witnesses:
C. W. McGHEE,
M. B. GORDON.